(12) United States Patent
Herbert

(10) Patent No.: US 6,897,641 B1
(45) Date of Patent: May 24, 2005

(54) BUCK (OR BOOST) CONVERTER WITH VERY FAST OUTPUT CURRENT TRANSITIONS AND LOW RIPPLE VOLTAGE

(76) Inventor: Edward Herbert, 1 Dyer Cemetery Rd., Canton, CT (US) 06019-2029

( * ) Notice: Subject to any disclaimer, the term of this patent is extended or adjusted under 35 U.S.C. 154(b) by 0 days.

(21) Appl. No.: 10/710,191

(22) Filed: Jun. 24, 2004

(51) Int. Cl.$^7$ .................................................. G05F 1/40
(52) U.S. Cl. .................................................... 323/282
(58) Field of Search ............................. 323/220, 222, 323/272, 282, 283, 351

(56) References Cited

U.S. PATENT DOCUMENTS

| | | | | |
|---|---|---|---|---|
| 4,727,308 A | * | 2/1988 | Huljak et al. | 323/222 |
| 5,654,881 A | * | 8/1997 | Albrecht et al. | 363/25 |
| 6,400,579 B2 | * | 6/2002 | Cuk | 363/16 |
| 6,696,823 B2 | * | 2/2004 | Ledenev et al. | 323/272 |
| 6,747,442 B2 | * | 6/2004 | Olsen et al. | 323/283 |
| 6,753,723 B2 | * | 6/2004 | Zhang | 327/540 |
| 6,803,750 B2 | * | 10/2004 | Zhang | 323/222 |

* cited by examiner

Primary Examiner—Adolf Berhane

(57) ABSTRACT

In a multiphase buck converter running at precise duty cycles which have an inverse integer relationship with the number of phases and a precise synchronized phase relationship, it is possible to have zero output ripple. If the output inductors are replaced with coupled inductors having nominally the same inductance, and the second windings of the inductors are wired in a loop with correct phasing, under steady state conditions the voltage drop around the loop will be zero. A small voltage injected into the loop can cause very fast transitions in current in the loop, and those currents will be reflected to the first windings of the inductors as a very rapid transition in the output current. This converter has no dc voltage control capability, so it is preferably used with a pre-regulation stage as the control of the dc output voltage. Dynamic voltage control is very fast, as the current into the output capacitor can change very rapidly.

10 Claims, 10 Drawing Sheets

Vi = 2 Vo

D1 = 0.500

Vi = 2 Vo

D1 = D2 = 0.500

Vo = 4 Vi
D1 = D2 = D3 = D4 = D5 = 0.750

Vo = 2 Vi
D1 = D2 = D3 = D4 = D5 = 0.500

US 6,897,641 B1

BUCK (OR BOOST) CONVERTER WITH VERY FAST OUTPUT CURRENT TRANSITIONS AND LOW RIPPLE VOLTAGE

BACKGROUND OF INVENTION

In a buck converter, it is desired to have a very fast transient response, but also a very low ripple voltage. In present buck converters, these are conflicting goals.

SUMMARY OF INVENTION

In a multiphase buck converter running at precise duty cycles which have an inverse integer relationship with the number of phases and a precise synchronized phase relationship, it is possible to have zero output ripple.

If the output inductors are replaced with coupled inductors having nominally the same inductance, and the second windings of the inductors are wired in a loop with correct phasing, under steady state conditions the voltage drop around the loop will be zero. A small voltage injected into the loop can cause very fast transitions in current in the loop, and those currents will be reflected to the first windings of the inductors as a very rapid transition in the output current.

This converter has no dc voltage control capability, so it is preferably used with a pre-regulation stage as the control of the dc output voltage. Dynamic voltage control is very fast, as the current into the output capacitor can change very rapidly.

DETAILED DESCRIPTION

Figure 1:
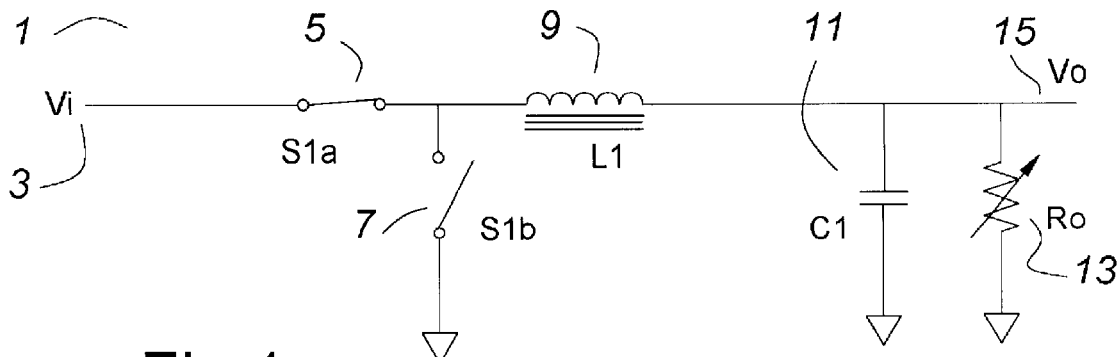
FIG. 1 shows a prior art buck converter.

FIG. 1 shows a prior art buck converter circuit 1 having an input voltage Vi 3 and an output voltage Vo 15. Switches S1a 5 and S1b 7 are operated alternately to generate an average voltage on an inductor L1 9, and at steady state that average voltage appears on the output Vo 15, filtered by the output capacitor C1 11, as would be well known by one skilled in the art of converters. An output load 13 is shown as a variable resistor, as an illustration, not a limitation.

As a prelude to the introduction of this invention, consider that the buck converter 1 is operated at precisely 0.500 duty cycle. In this case the output voltage Vo is one half of the input voltage Vi, and the buck converter 1 will have no capacity to regulate the output voltage Vo. Accordingly, it is assumed that the input voltage Vi 1 is controlled by a pre-regulator (not shown), and the pre-regulator may be adjusted to control the output voltage Vo. In this respect, it is analogous to a common circuit arrangement in which a first stage regulator feeds a transformer circuit operating at "100 percent" duty cycle and a two to one ratio. The output voltage may be fed back to the first stage regulator.

The switches S1a 5 and S1b 7 (and all of the other switches in this specification) are preferably "solid state" switches, as examples, not limitations, MOSFETs, JFETs, bi-polar transistors, diodes, rectifiers, synchronous rectifiers and the like. One skilled in the art of power converters would know how to design and use solid state switches appropriate for the circuits, and the nature of the switches in not a point of novelty. Likewise, control circuits are needed to operate the solid state switches with the correct timing and in response to feedback and other control stimuli. One skilled in the art of power converters would know how to design and use such control circuits, and the nature of the control circuits is not a point of novelty. Accordingly, in this specification and the claims, a "switch" or "switching means" is a generic circuit element that can open and close with the correct timing. A "timing means" or "control means" is a controller means that can operate the switches with the appropriate timing. Generic switch symbols are used in the schematics, and the timing is as defined in the specification text and various graphs in the figures. One skilled in the art of power converter design would know how to use this information to make practical circuits.

Figure 2:
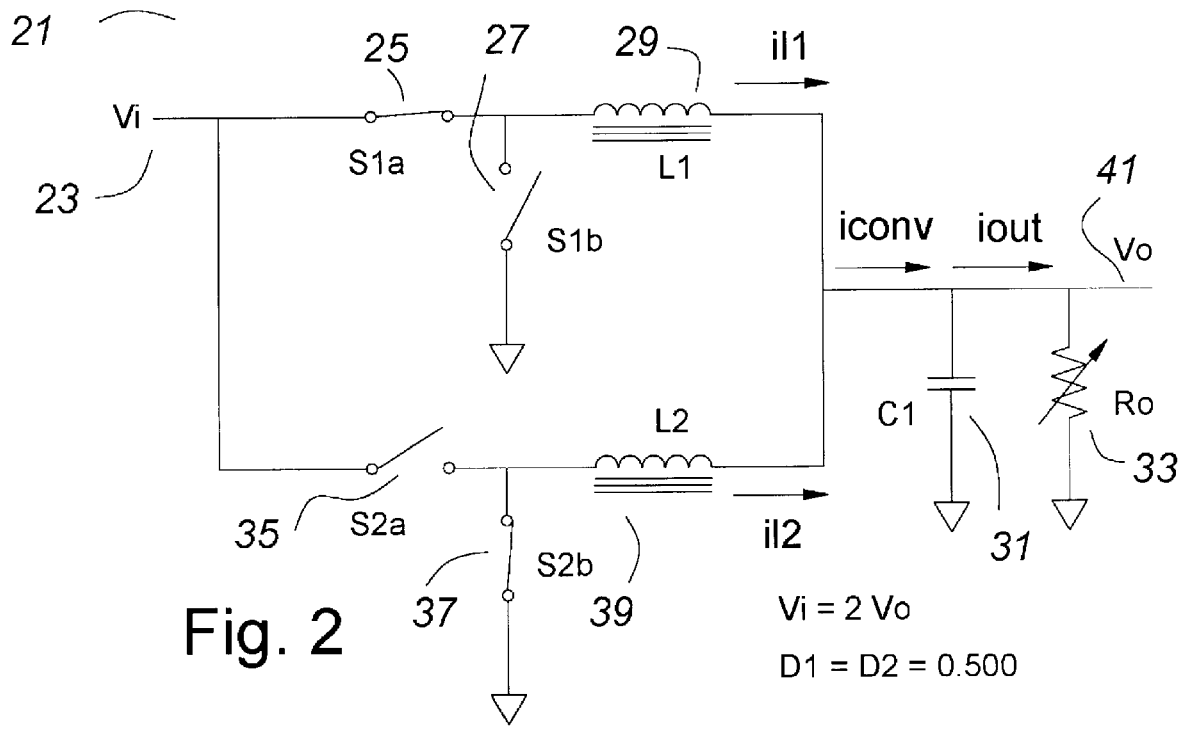
FIG. 2 shows a two phase buck converter. If the duty cycles are precisely 0.500, the output voltage is one half of the input voltage and there is no ripple in the output.

FIG. 2 shows a two phase buck converter 21 having an input voltage Vi 23 and an output voltage Vo 41. Switches S1a 25, S1b 27, S2a 35 and S2b 37 generate average voltages on two inductors L1 29 and L2 39. The inductor currents i11 and i12 are combined as the converter output current iconv which, when filtered by a capacitor C1 31 becomes the output current iout to a load Ro 33, shown as a variable resistor as an illustration, not a limitation.

In FIG. 2, the duty cycles D1 and D2 are precisely 0.500 (except that they can be tweaked to maintain balance between the currents i11 and i12). Accordingly, the output voltage Vo is one half of the input voltage Vi, and the two phase buck converter 21 has no ability to regulate the dc output voltage. In a buck converter, the duty cycle is usually defined as the ratio of the time that the input switch is closed to the total period. Accordingly, in the present example, the first switch S1*a* 25 is closed 0.500 of the total period. Whenever S1*a* is open, S1*b* is closed, as is usual for a buck converter. S1*a* may be a MOSFET, as an example, not a limitation, and S1*b* may also be a MOSFET as a synchronous rectifier or it may be a Schottky rectifier, as examples, not limitations.

Figure 3:
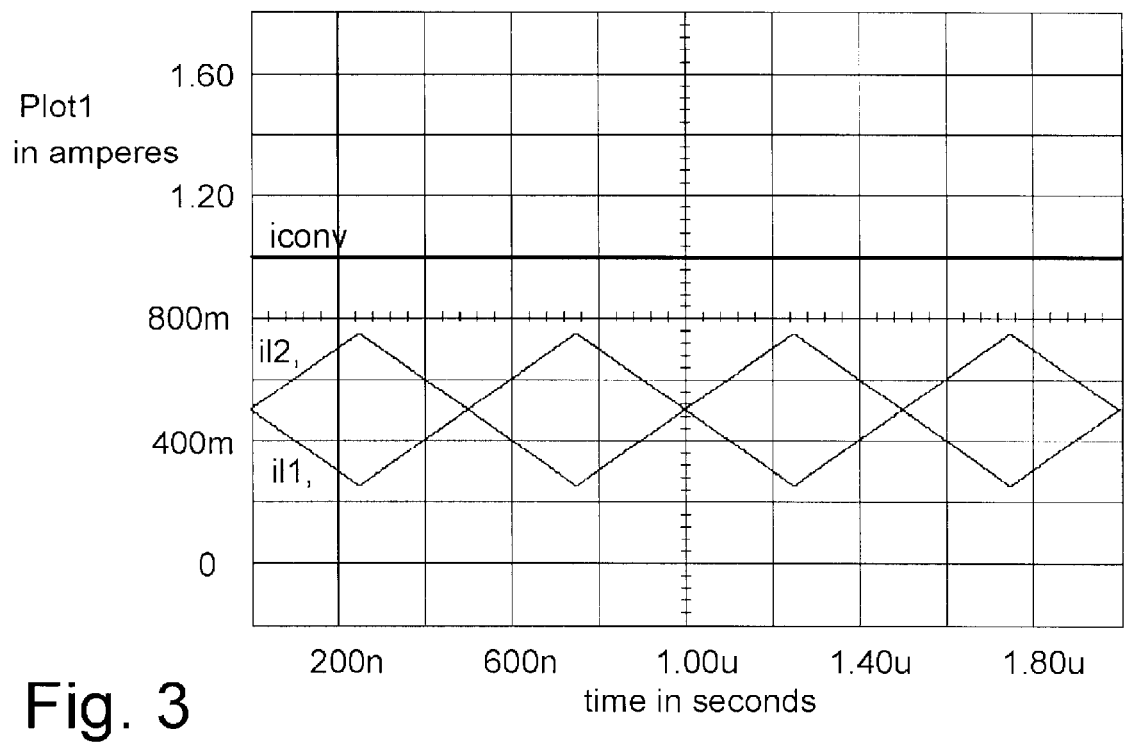
FIG. 3 shows the currents i11 and i12 in the inductors L1 and L2 of FIG. 3 as well as the converter output current iconv.

To achieve the objectives of this invention, S2*a* 35 has the same timing as S1*b* 27, and S2*b* has the same timing as S1*a* 25. That is, whenever S1*a* 25 is closed, S2*a* 35 is open, and vice versa. With this condition, the converter output current iconv has no ripple component, as shown in FIG. 3. The inductor currents il1 and il2 each have complimentary triangle current wave forms, and their sum is a constant current. At steady state conditions, this equals the output current iout. It should be noted that the ideal duty cycle of 0.500 is for an ideal circuit. In a practical circuit there may be imbalances in component values, voltage drops, circuit impedances and so forth which may cause one current il1 or il2 to drift up or down, and there will be a complimentary drift in the other. This can be corrected by tweaking the duty cycle somewhat, perhaps to 0.490 for one input switch and 0.510 for the other, as an illustration, perhaps more or perhaps less, and this would be expected to vary with operating conditions. However for tweaking the currents to attain current balance while maintaining zero ripple in the converter output current iconv, the switches are nonetheless operated synchronously as described above.

Figure 4:
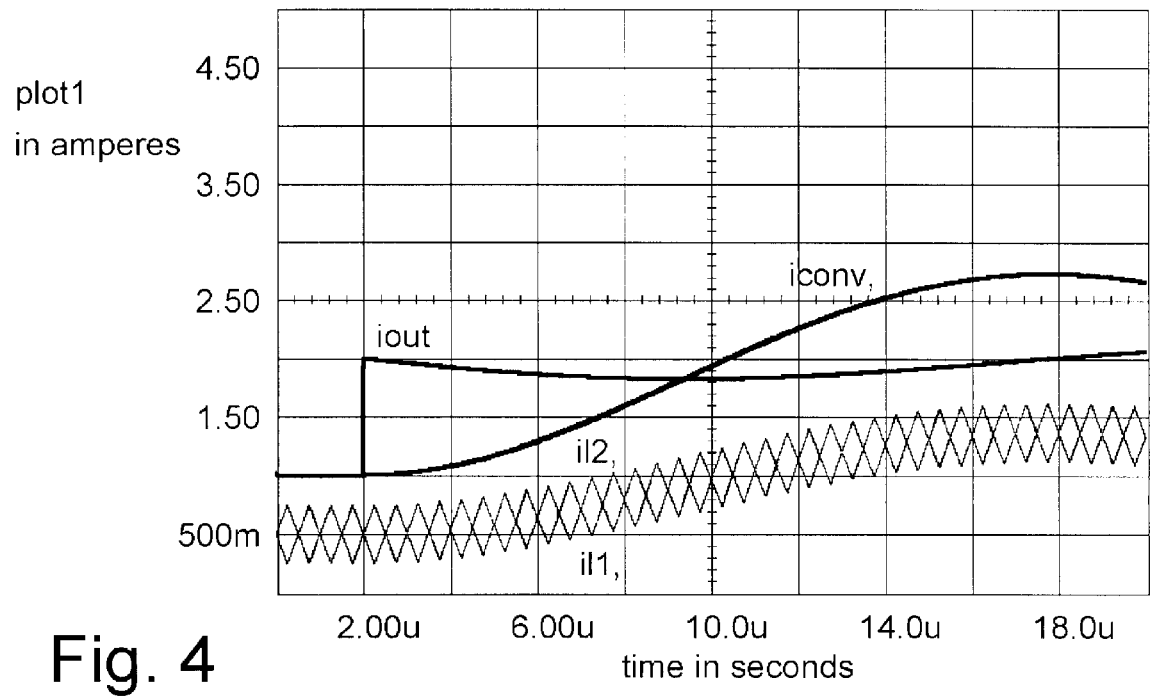
FIG. 4 shows the transient response of the converter of FIG. 2 with a step load change. It is not very good.

Unfortunately, this circuit 21 has very poor load regulation, as shown in FIG. 4. While this could be improved using feedback control, this invention teaches a better method of improving load regulation. To complete the discussion, output regulation could be improved through changing the input voltage Vi to cause the inductor currents il1 and il2 to ramp up faster, or the duty cycles could be increased to achieve the same result. However, it would take a large change in the input voltage to make much of an improvement, and any change in the duty cycle relationship of 0.500 would greatly increase the ripple current.

Figure 5:
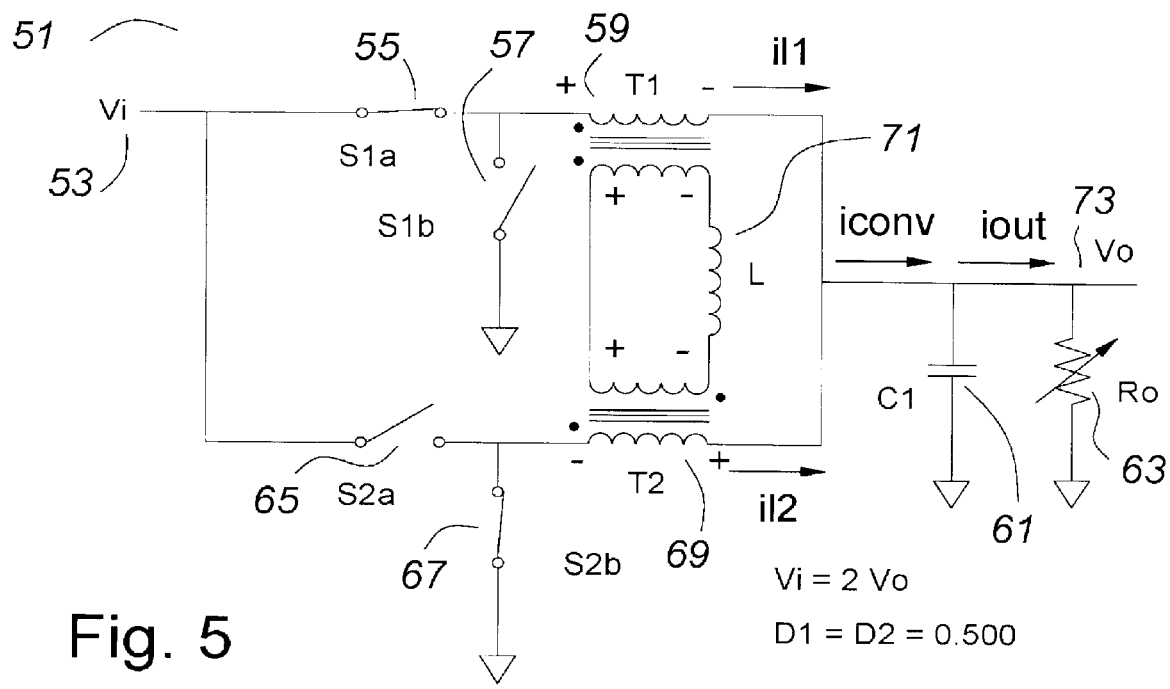
FIG. 5 shows the converter of FIG. 2 with the inductors replaced with coupled inductors.

FIG. 5 shows a two phase buck converter circuit 51 with is similar to the two phase buck converter 21 of FIG. 2 except that the two inductors L1 29 and L2 39 have been replaced with coupled inductors T1 59 and T2 69. The converter 51 has an input voltage Vi 53 and an output voltage Vo 73. Four switches S1*a* 55, S1*b* 57, S2*a* 65 and S2*b* 67 are controlled at a precise duty cycle of 0.500 to provide an average voltage to the couple inductors T1 59 and T2 69. Currents il1 and il2 combine as the converter current iconv which is then filtered by an output capacitor C1 61 to a load Ro 63, shown as a variable resistor for discussion purposes.

The second windings of the coupled inductors T1 59 and T2 69 are connected as shown in FIG. 5, where the usual dot convention is used to show the correct phasing. An inductor L 71 may just represent the combined secondary leakage inductance or it may be a purposefully added component.

With the precise operation of the switches as discussed with FIG. 2, the voltage around the secondary loop of the coupled inductors T1 59 and T2 69 is zero. This can be seen in FIG. 5 where the polarity of the voltage across the inductors is shown for the switch positions shown. The voltage across each of the inductors T1 59 and T2 69 is one half the input voltage Vi (which also equals the output voltage Vo) with polarity as shown. In the secondary loop, the equal and opposite voltages cancel. The same is voltage cancellation holds true when the switches change state as described in the discussion of FIG. 2 although the polarity in each secondary will be opposite.

It can be seen by inspection, however, that if a large current could be induced into the secondary loop, it would reflect to the converter output current iconv additively, equally in each of the coupled inductors T1 59 and T2 69, given their phase relationship as shown by the dots. It is well known that the current through an inductor cannot change instantaneously or even very fast, but that refers to the net ampere turns in the inductor, or the magneto-motive force. The current in one winding can change arbitrarily fast, however, if there is an equal and opposite change in one or more other windings such that the net ampere turns in the inductor is maintained.

Figure 6:
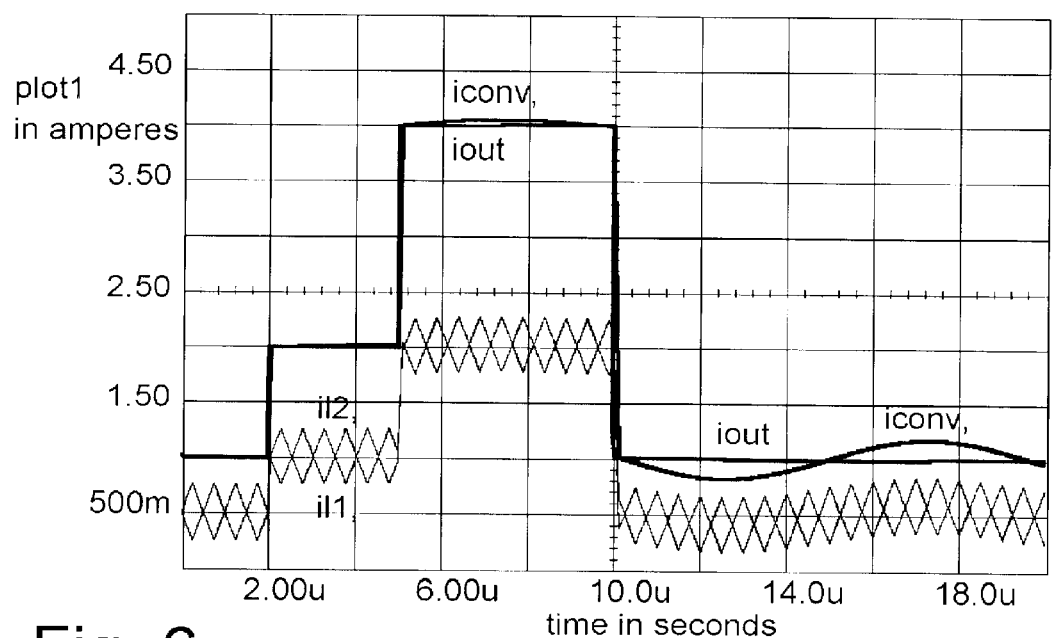
FIG. 6 shows the transient response of the converter of FIG. 5 with step load changes. It is very good.
Figure 7:
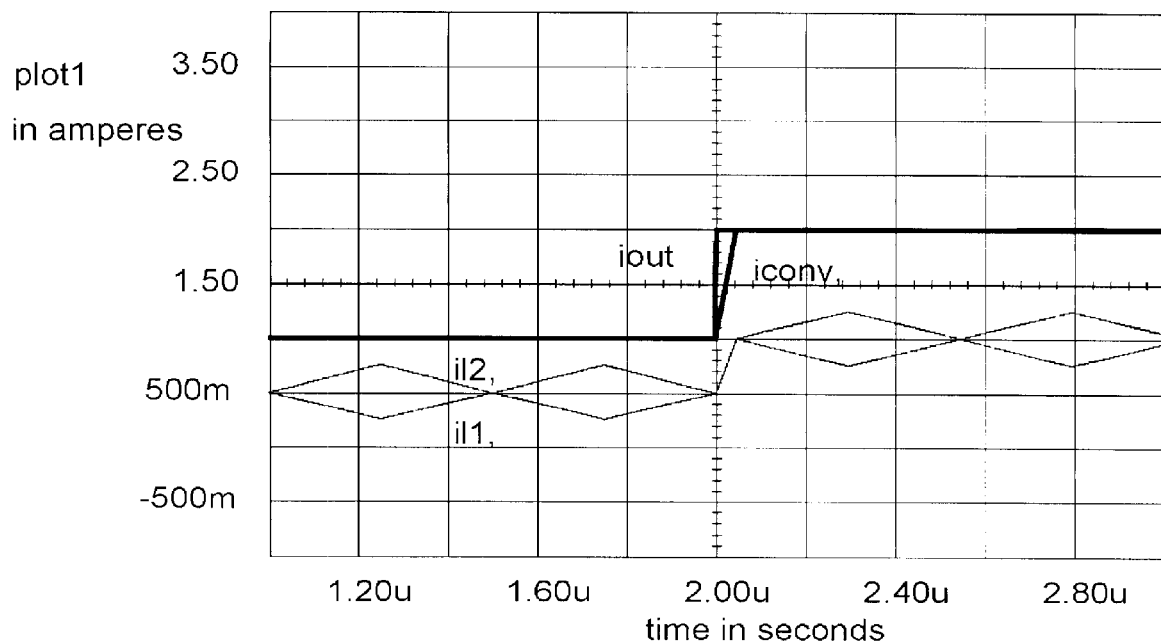
FIG. 7 shows the transient response of the converter of FIG. 5 with a positive step change in load with an expanded time scale.

The benefits of the converter 51 of FIG. 5 can be seen in FIG. 6. It is assumed that the output load Ro 63 has undergone a step change as shown by the curve iout. It can be seen that the current iconv follows extremely rapidly. This can be seen in greater detail in FIGS. 7 and 8, which show, respectively, a step increase and a step decrease in load. In FIG. 7, it can be seen that the inductor currents il1 and il2 have complementary triangular wave forms at steady state. At the transient, however, both ramp up rapidly so that the total converter current iconv will closely follow the output current iout. Similarly, in FIG. 8, both il1 and il2 ramp down rapidly so that the total converter current iconv will closely follow the output current iout.

There are several ways that this can be accomplished, but they have in common that a voltage is induced or injected into the secondary loop. In the converter 51 of FIG. 5, this may be accomplished by inserting a segment into the timing pulses during which the switches S1*a* 55 and S2*a* 65 are momentarily in phase, either both closed (with their compliments S1*b* 57 and S2*b* 67 both open) to increase the current rapidly or with both open (with their compliments S1*b* 57 and S2*b* 67 both closed) to decrease the current rapidly. It can be seen by inspection that if both switches S1*a* 55 and S1*b* 65 are in the same state, the voltages no longer cancel in the secondary loop, they add, and the polarity depends upon which state that the switches S1*a* 55 and S2*a* 65 are in. The total voltage around the loop will equal the input voltage Vi, and the impedance of the loop is very small. In FIG. 5, the impedance is just the inductor L 71, and the loop current will rise (or fall) at a rate di/dt equal to Vi/L.

Figure 8:
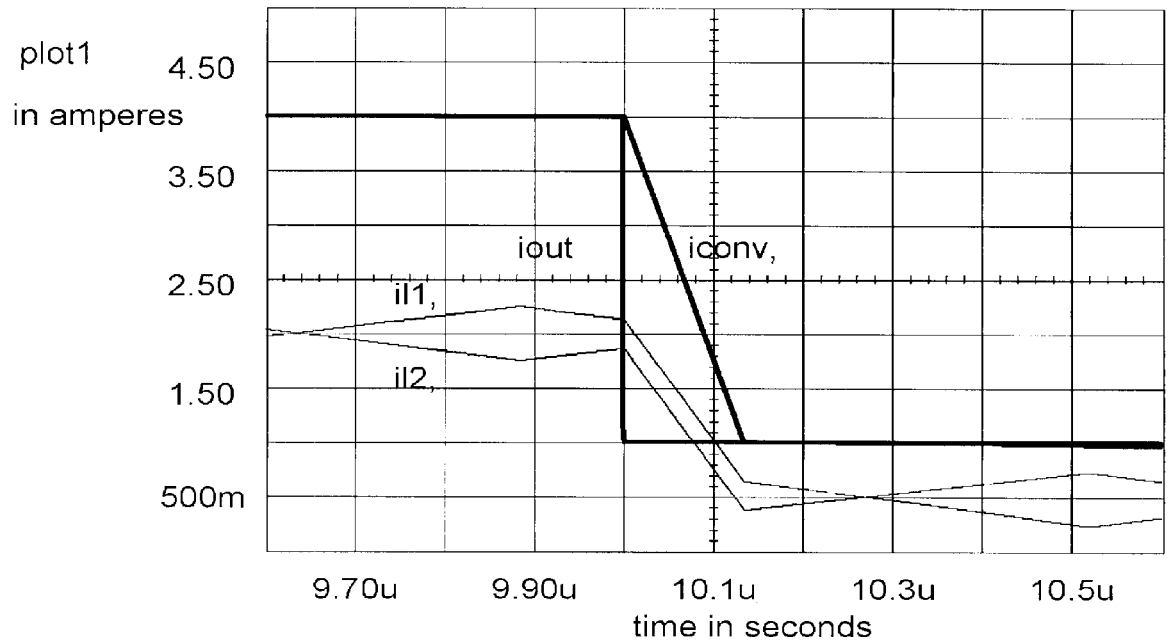
FIG. 8 shows the transient response of the converter of FIG. 5 with a negative step change in load with an expanded time scale.
Figure 9:
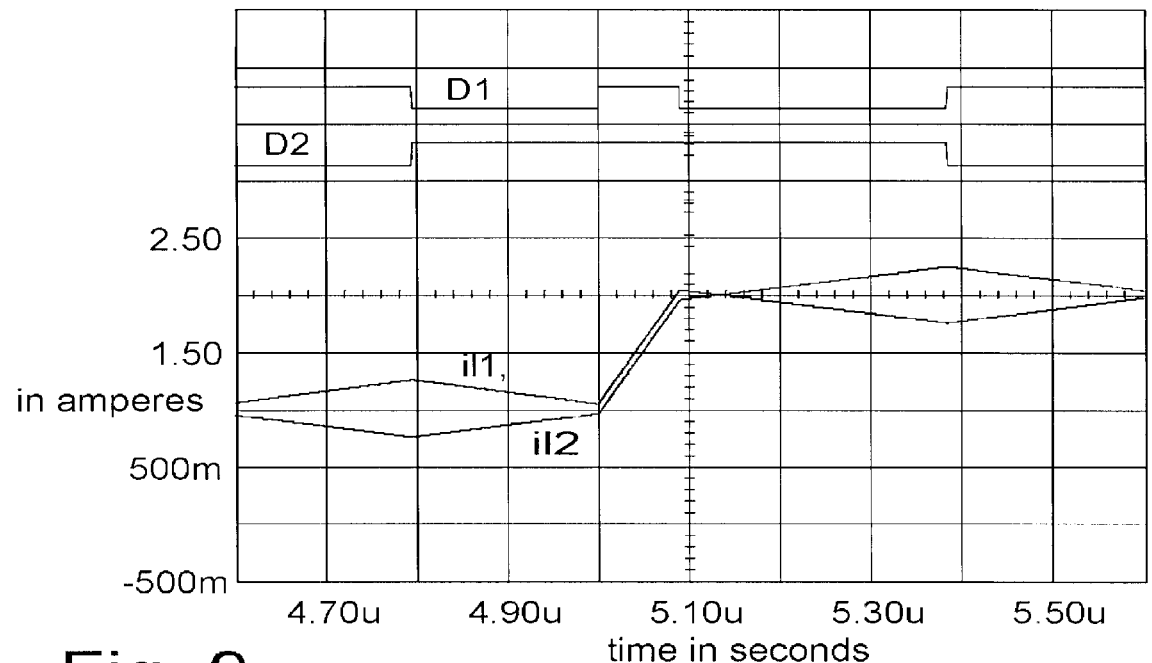
FIG. 9 shows the duty cycle of the switches of the converter of FIG. 5 with a positive step change in load with an expanded time scale.
Figure 10:
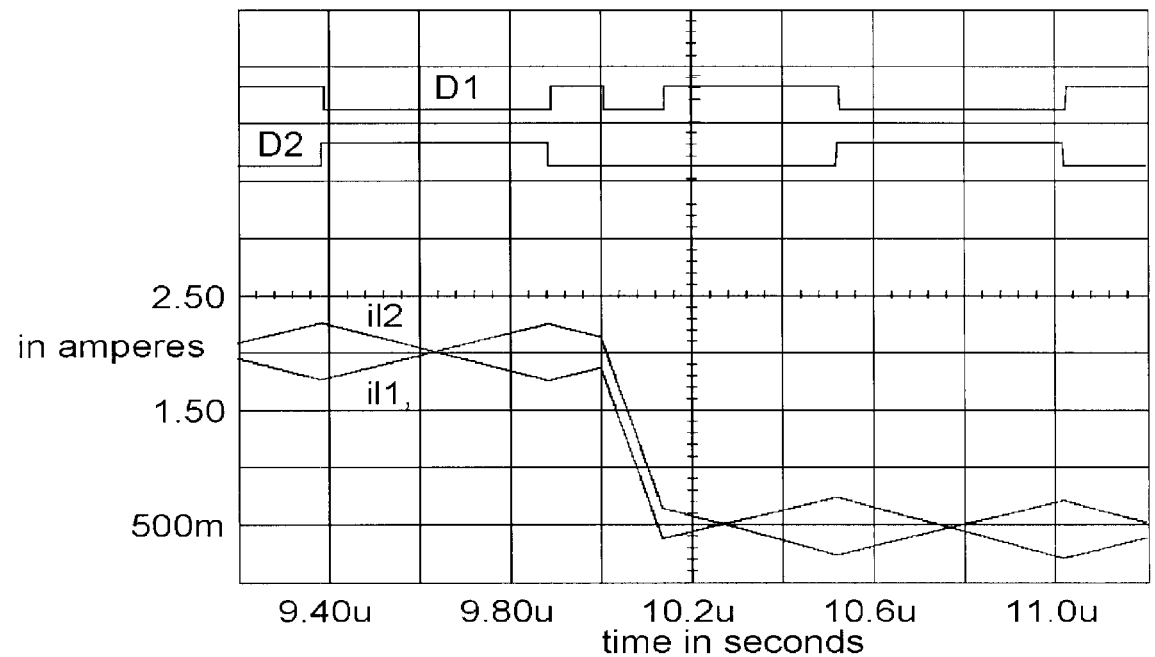
FIG. 10 shows the duty cycle of the switches of the converter of FIG. 5 with a negative step change in load with an expanded time scale.

This can be seen graphically in FIGS. 9 and 10, which show, respectively, the same step changes in current as in FIGS. 7 and 8. In FIG. 9, the both switches S1*a* 55 and S2*a* are on (closed) simultaneously as the current rises. In FIG. 9, both are off (open) simultaneously as the current falls. It should be noted, however, that to maintain the complementary triangular wave forms after the transient, the time that both switch are in the same state, both on or both off, is added to the switching period. The graphs in this specification are the output graphs of SPICE simulations, and it was discovered early on that this was necessary to maintain circuit symmetry, that is il1 and il2 being equal on average.

Figure 11:
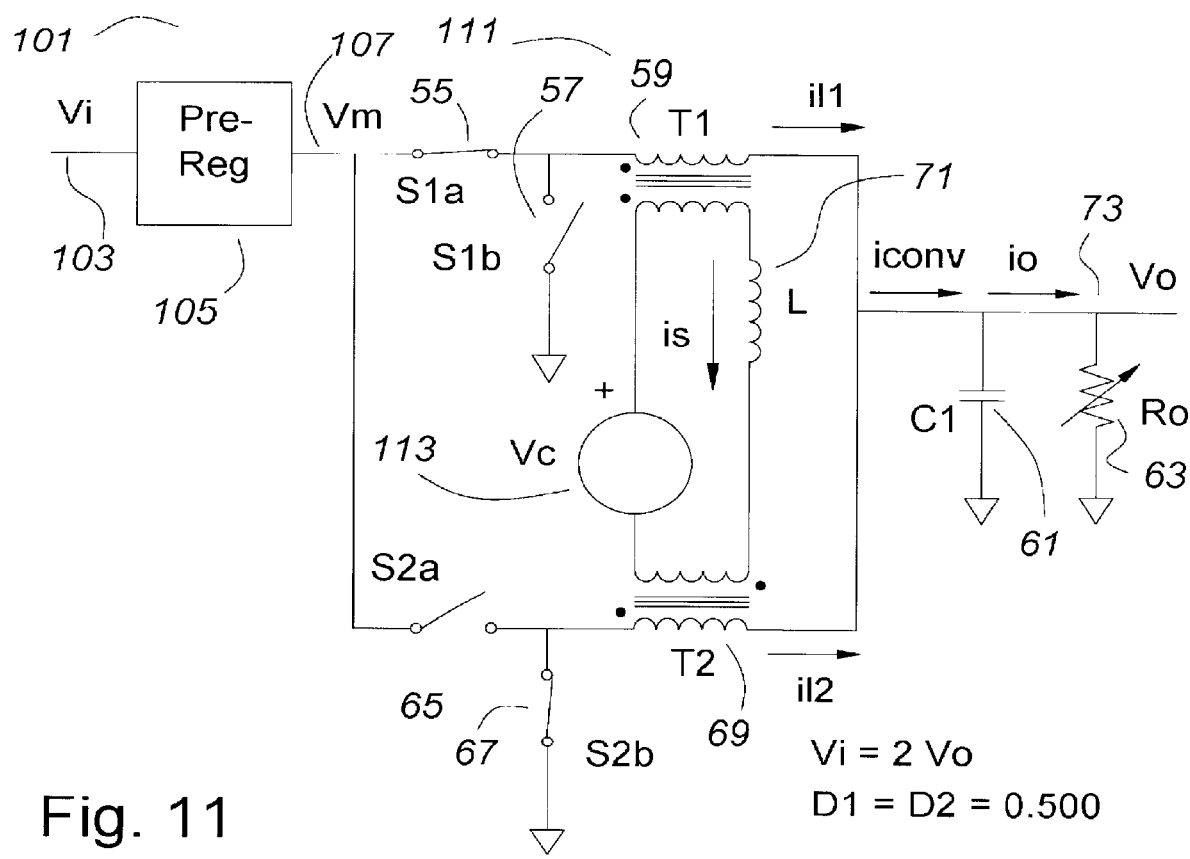
FIG. 11 shows that a voltage can be injected into the loop of the second inductor windings of the converter of FIG. 5. Because the converter of FIG. 5 has no dc voltage control, a pre-regulator is shown to control the dc output voltage.

FIG. 11 shows a converter 101 comprising a voltage pre-regulator 105 having an input voltage Vi 103 and an output voltage Vm 107, and a two phase buck converter of this invention 111 that is the two phase buck converter 51 of FIG. 5 with the addition of a voltage injection circuit 113 to inject a voltage Vc into the secondary loop to control the output current iconv of the converter 101 during transients of the load 73.

The voltage pre-regulator 105 has an input voltage Vi 103 that may be an unregulated voltage bus. It is contemplated that the voltage pre-regulator may be a buck converter of conventional design, but any voltage regulation means may be used. It is also contemplated that the pre-regulator 105 will control the output voltage Vo 73, with appropriate compensation to ensure overall loop stability, as would be known to one skilled in the art of power converters. The output of the pre-regulator 105 is an intermediate voltage Vm 107 which will be nominally equal to two times the output voltage Vo 73.

At steady state conditions, the voltage source 113 Vc is zero, but it can controlled, positive or negative, to change the converter output current iconv very rapidly in either direction. The voltage Vc will induce a change of the current is around the loop di/dt equal to Vc/L, and it will reflect equally to both inductor currents il1 and il2 so that it is doubled in the output current iconv of the converter.

Figure 12:
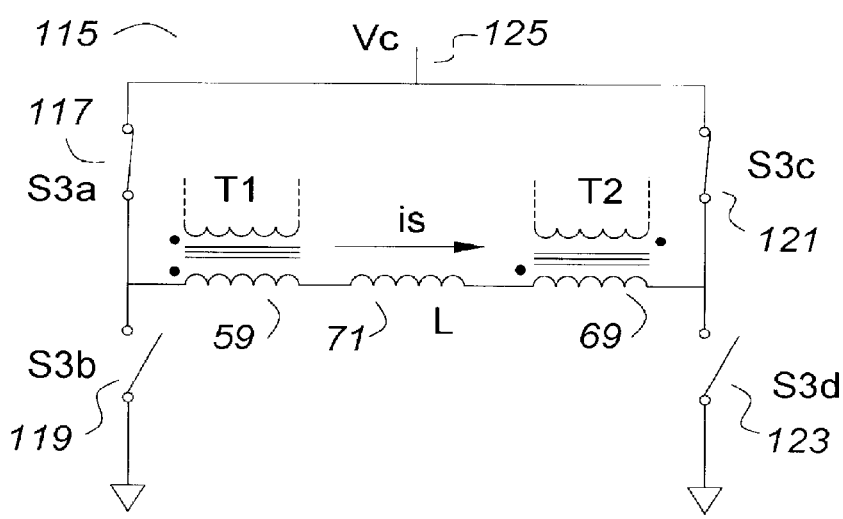
FIG. 12 shows one possible circuit for injecting the voltage into the secondary loop for the converter of FIG. 11.

FIG. 12 shows a possible voltage injection circuit 115 for use in the two phase buck converter 111 of FIG. 11. A full bridge circuit comprising four switches S3a 117, S3b 119, S3c 121 and S3d 121 may be operated to inject a control voltage Vc 125 of either polarity into the secondary loop comprising the coupled inductors T1 59 and T2 69 and the inductor L 71. In FIG. 12, the switches S3a 117 and S3c 121 are shown closed. It is necessary for the loop to be a closed circuit so that the secondary loop current is can circulate.

In an ideal circuit, the circulating current in the secondary loop would be loss-less and its magnitude would not matter. A practical circuit would have losses, so it would be desirable for the current in the secondary loop to decay to zero after a transient. This will tend to happen if there is resistance in the secondary loop, and additional resistance can be added to the secondary loop to make the decay faster and more precise. As the current in the secondary loop decays, this will be reflected to the inductor currents il1 and il2, but the change can be fairly slow by design, slow enough so that the total converter current iconv can be maintained by tweaking the intermediate voltage Vm under feedback control.

In FIG. 5, the situation is different. While the same effect is present, superimposed on it is an effect of the secondary loop voltage. If the intermediate voltage Vm is not equal to exactly two times the output voltage Vo, a difference voltage will appear in the secondary loop. While this voltage is much smaller than the effect of having the switches S1a and S2a in phase, or of injecting a voltage Vc, it will nonetheless cause the current to rise in the secondary loop and that will be reflected to the inductor currents il1 and il2. Thus this is an alternative method of current control, and one that is less sensitive, yet still much improved over response of the circuit of FIG. 2.

For comparison, consider that the in-phase switching method is used. In this case, the net voltage around the secondary loop is plus or minus the intermediate voltage Vm. If an injected voltage is used, the net voltage around the secondary loop is plus or minus the control voltage Vc. If the intermediate voltage Vm is raised or lowered to be different than two times the output voltage, then the net voltage around the secondary loop is plus or minus the difference voltage Vm-2 Vo.

Figure 13:
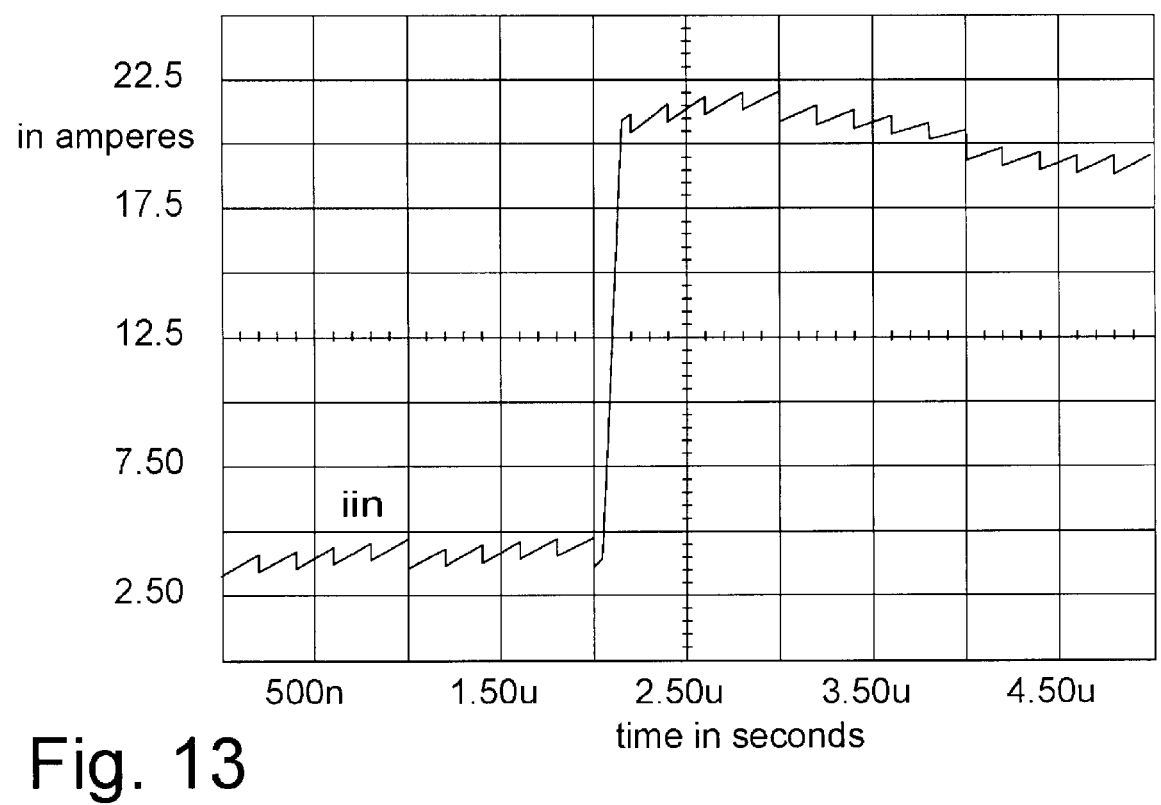
FIG. 13 shows the input current with a positive step change in load.

FIG. 13 shows the input current wave form iin for a step increase in load current. While there is a small saw-tooth ripple, it is a continuous current. It increases very rapidly, however, as the load current increases. With reference to FIG. 11, the current iin is the current out of the pre-regulator 105. To accommodate the very large step change in current, the pre-regulator 105 must have a low impedance output, as by having a large output capacitor and a good loop response.

Figure 14:
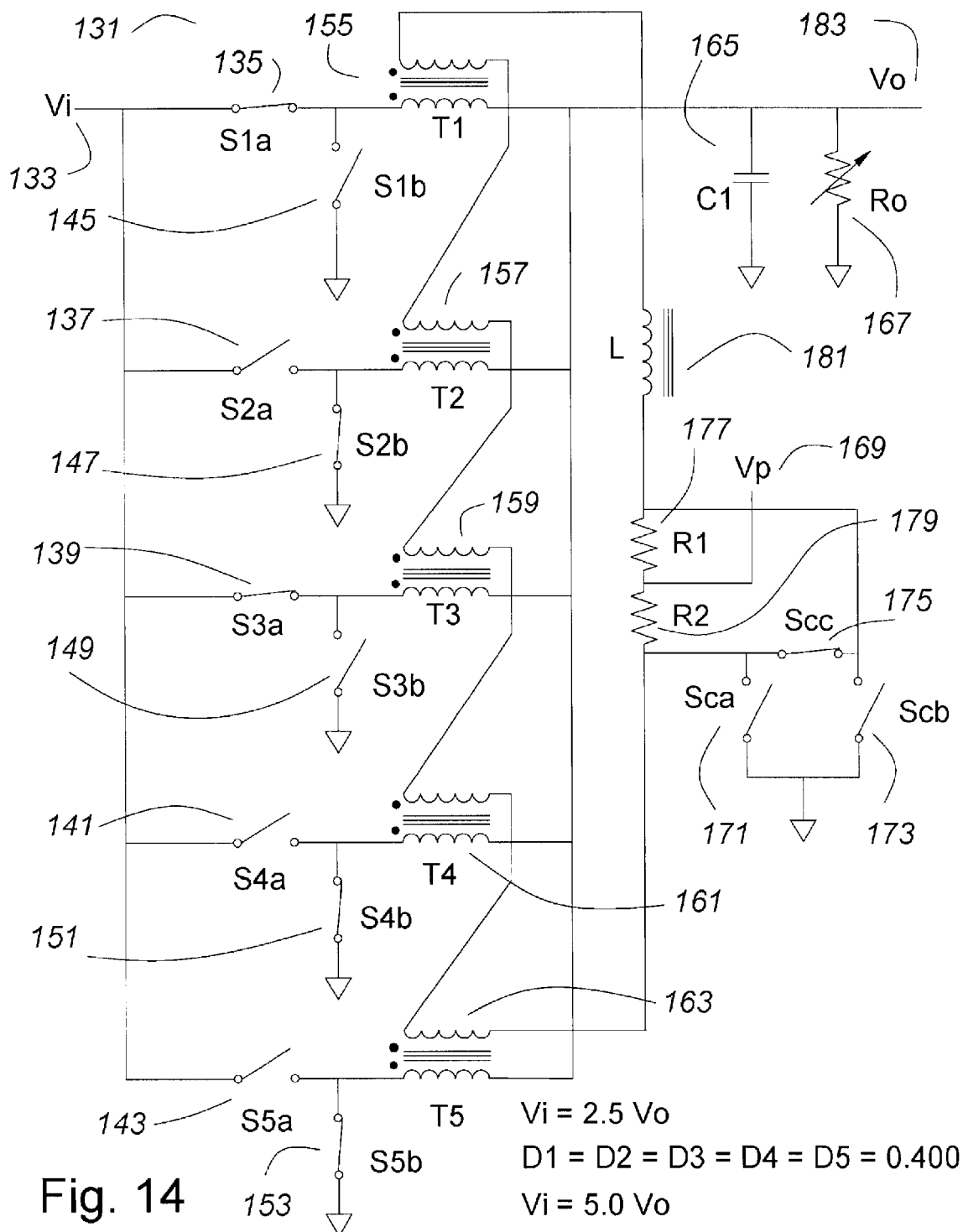
FIG. 14 shows that the circuit can be expanded to five phases, and also shows an alternate method of injecting voltage into the inductor loop.

FIG. 14 shows a five phase buck converter 131 having an input voltage Vi 133 and an output voltage Vo 183. Five input switches S1a 135 to S5a 143 and five catch switches S1b 145 to S5b 153 control the average voltage on five coupled inductors T1 155 to T5 163. When filtered by an output capacitor C1 165 the output current is taken to a load 167 shown for illustration purposes as a variable resistor.

The secondary loop of the five coupled inductors T1 155 to T5 163 is connected in series, phased as indicated by the dots. An inductor L 181 may represent the total leakage inductance of the loop, or it may be a purposefully added component. There are two resistors R1 177 and R2 179 in the secondary loop as well. These are used as voltage injection points for a simple voltage injection circuit comprising a control voltage source Vp 169 and two switches Sca 171 and Scb 173 connected to a return. In operation, either Sca 171 or Scb 173 can be closed to inject voltage into the loop and the polarity is controlled by which switch Sca 171 or Scb 173 is closed. This very simple circuit resembles a push pull drive circuit, and its ground referenced control (if MOSFETs are used) is very simple. The resistors R1 177 and R2 179 be bypassed by closing an optional switch Scc 175 when neither Sca 171 nor Scb 173 is closed.

This circuit is similar in operation to the circuit 111 described above in reference to FIG. 11. With five phases, there are several ripple free operating conditions, occurring when the duty cycle is equal to m/5, where m is the number of input switches S#a operated so as to be on at the same time, and n is the number of phases. Thus duty cycles of 1/5, 2/5, 3/5, 4/5 and 5/5 are "legal" and will result in ripple free operation. They also result in a net zero voltage around the secondary loop at steady state.

Two duty cycles are shown in the text on the schematic of FIG. 14, and are practical as processor power converter output stages. Assuming an output voltage in the order of 1 volt, the input voltage Vi can be 2.5 volts or 5.0 volts nominal. Recently a number of papers have suggested that a two stage power converter stage is more efficient for a processor power converter than a single stage operating from 12 volts, as an illustration, not a limitation. Usually, a loosely regulated fixed voltage is generated using a buck converter to power a multiphase output stage buck converter. The same components can be used in this circuit, with the modification of the coupled inductors and voltage injection circuits. Additionally, the control for the first stage may be controlled by feedback from the output.

In a practical scenario, the voltage on the output capacitor may be sensed to detect a change in output current, or it may be directly measured. Rapid current changes are accommodated by injecting a voltage in the secondary loop to rapidly change the converter current as necessary to maintain the output voltage Vo 183 in regulation. However, the five phase buck converter operating at a fixed duty cycle cannot control the dc output voltage, so a slower feedback loop may control the input voltage Vi 133 so as to fine tune the output voltage Vo 183.

Figure 15:
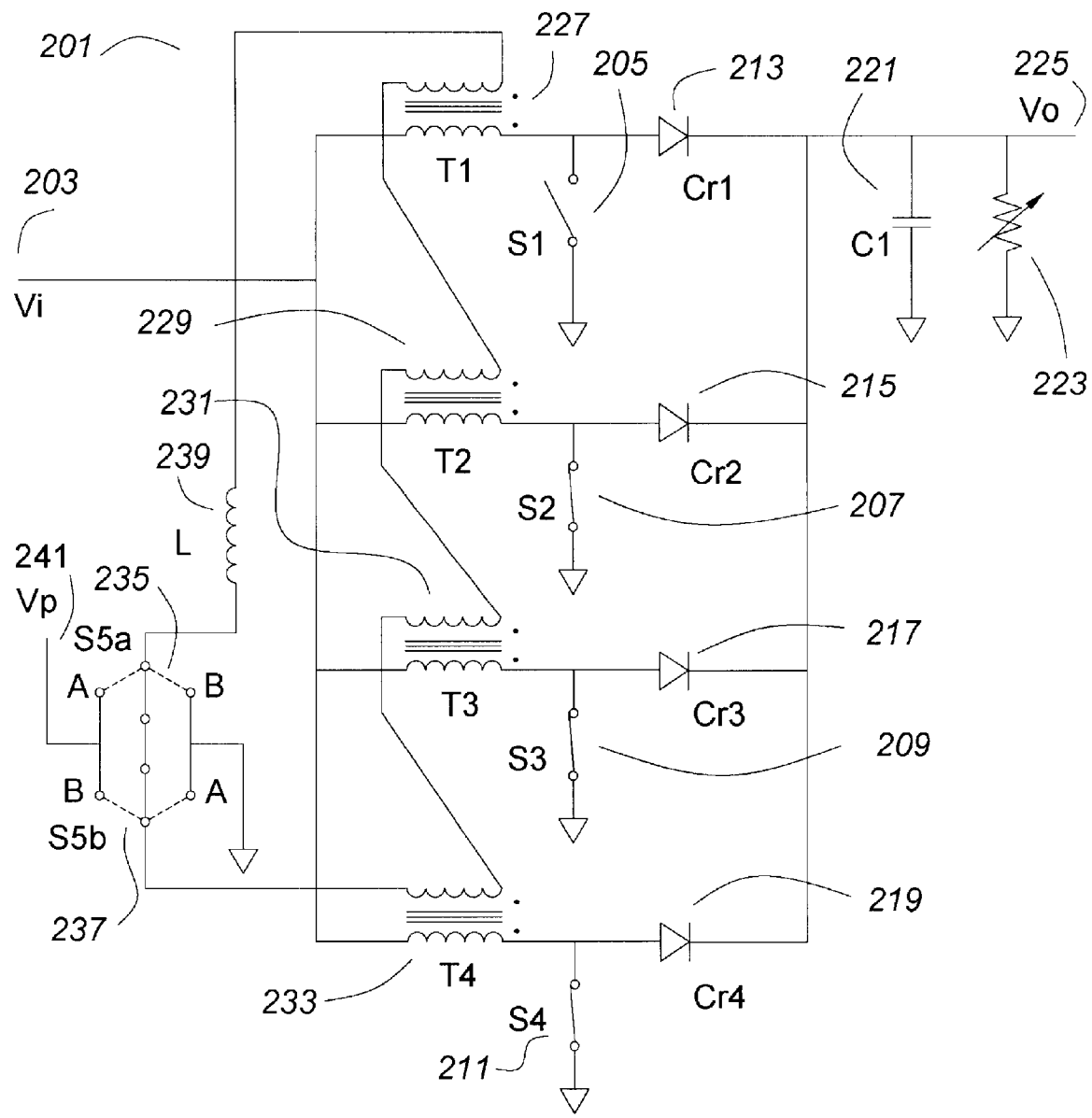
FIG. 15 shows that the circuit can be mirrored to become a boost converter, and also shows an alternative method of injecting voltage into the inductor loop.

FIG. 15 shows a multiphase boost converter 201 having an input voltage Vi 203 and an output voltage Vo 225. Four boost switches S1 205 to S4 211 charge four coupled inductors T1 227 to T4 233 when any of them is closed, and four rectifiers Cr1 213 to Cr4 219 transfer the current to an output storage capacitor C1 221 when any of the switches S1 205 to S4 211 is open. An output load 223 is shown as a variable resistor.

The boost converter is a buck converter operated in reverse, (and recitation of a buck converter in this specification and the claims includes the equivalent "reverse buck" or boost converter) so it is natural to apply the teachings of this invention to a boost converter as well. When operated at a duty-cycle that has an inverse integral relationship to the number of phases, the input ripple current will be zero, as will the voltage around the secondary loop of the coupled inductors T1 227 to T4 233. (Understanding this requires some sorting out, as the duty cycle is defined differently in the boost converter, and the input and output are swapped). Thus an input stage can be constructed with very low ripple, yet very fast dynamic response by injecting a voltage into the secondary loop using one or more of the three methods described above. In FIG. 15, the voltage is injected from a voltage Vp 241 through a pair of full bridge switches S5a 235 and S5b 237. At steady state conditions, the switches S5a 235 and S5b 237 are closed through, to close the secondary loop with no injected voltage. If both switches are in positions A, one polarity of voltage is applied to the secondary loop, and if both switches are in position B, the other polarity is applied to the secondary loop. An inductor L 239 may represent the stray inductance of the loop or it may be a purposefully installed component.

As an analog to the alternative current control of FIG. 5, a much smaller differential voltage will be applied to the loop if the input and output voltages Vi and Vo differ from ideal, so a slower transition can be achieved by tweaking Vo. As it would not usually be desirable to have extremely fast transients in the input current, this may be the preferred mode of control for an input boost circuit, an it will simplify the circuit by eliminating the voltage injection circuitry.

The four phase boost converter was chosen for FIG. 15 to illustrate another characteristic of this circuit. If the input voltage is applied with all of the switches S1 205 through S4 211 open, the output voltage will tend to charge resonantly to two times the input voltage. If that is the desired output voltage, the switches can then be operated at 0.500 duty cycle to maintain that voltage.

If the switches are operated with a 0.500 duty cycle when the voltage Vi is applied, the output capacitor will tend to resonantly charge to four times the input voltage. If that is the desired output voltage, the duty cycle can then be changed to 0.750 to maintain that voltage.

Figure 16:
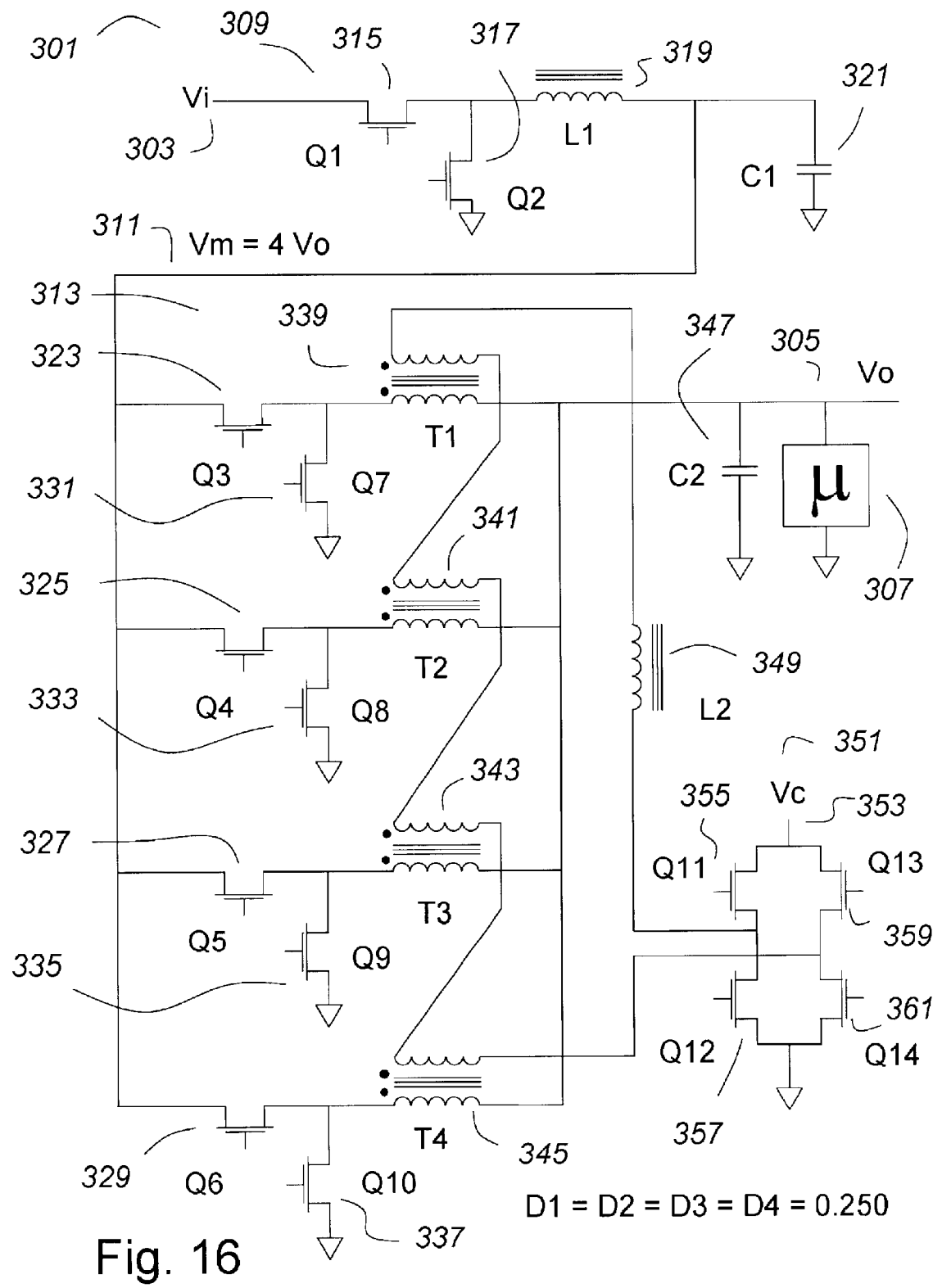
FIG. 16 shows a four phase buck converter of this invention with a buck pre-regulator, for supplying power to a micro-processor. A full bridge circuit injects voltage into a secondary loop.

FIG. 16 shows a power converter circuit 301 having an input voltage Vi 303 and an output voltage Vo 305 that, with appropriate controls, may power a microprocessor μ307. The output voltage Vo may be in the order of 1.0 volts at 100 amperes, as an illustration, not a limitation. A buck pre-regulator 309 provides an intermediate voltage Vm 311 to a four phase buck converter 313 of this invention. The switches in this FIG. 16 are shown as MOSFETs, as an illustration, not a limitation.

The buck pre-regulator 309 comprises an input switch Q1 315, a switch to return Q2 317, an inductor L1 319 and a filter capacitor C1 321. Because the four phase buck converter 313 operating at a fixed duty cycle has no ability to control its output voltage, the duty cycle of the buck pre-regulator 309 is modulated by feedback to control the dc output voltage Vo 305 by modulating Vm 311.

The four phase buck converter 313 comprises four input switches Q3 323 to Q6 329, four switches to return Q7 331 to Q10 337, four coupled inductors T1 339 to T4 345 and an output filter capacitor C2 347. The switches are operated at a fixed duty cycle of 0.250 in an inverse integral relationship for zero ripple operation. Accordingly, the output voltage Vo 305 is one fourth of the intermediate voltage Vm 311.

The second windings of the coupled inductors T1 329 to T4 345 are connected in series, phased as shown using the dot convention. Also in series with the secondary loop is an inductor I2 349 and a voltage injection circuit 351. The voltage injection circuit operates from a power source Vc 353 and comprises a full bridge switch comprising four switches Q11 355 to Q14 361. The operation of this voltage injection circuit is similar to that described for FIG. 12.

The output current could also be changed rapidly by altering the phasing of the switches as taught in FIG. 5.

In operation, micro-processors can have very fast transitions of current, and if they occur, the voltage injection circuit operates so as to cause a very rapid increase or decrease in the secondary loop current which will be reflected to the output times four (the number of phases). Voltage corrections at dc and for slower current transitions may be accommodated by modulating the voltage Vm out of the buck pre-regulator 309.

It is noteworthy that the current balance in the inductors is not assured. Slight impedance differences or timing irregularities may cause the various inductor currents to drift up or down as in prior art multi-phase buck converters. In the present example, the duty cycle is 0.250 nominally, or one fourth. Accordingly, one and only one of the input switches Q323 to Q6 329 will be on at any instant. Thus the current in any phase can be determined with a single current detecting circuit in the input, sampled when the phase in question is "on". Differences are corrected by tweaking the duty cycle timing slightly.

For this specification and the claims, a multiphase buck converter is operated in an "inverse integral relationship for zero ripple" if the duty cycle of each phase is equal (except for tweaking) and at every instant the same number of input switches is always on. In the present example, the duty cycle of each phase is 0.250. One of the input switches is always on and three of the switches to return are always on, cycling in an interleaved fashion. If there are n phases (in this example, four), and exactly m input switches are always on (in this example, one), the duty cycle has a inverse integral relationship m/n (1/4 in this example) for zero ripple. Four a four phase buck converter, the duty cycle may be 1/4, 2/4, 3/4 or 4/4 for ripple free operation. (4/4 is a degenerate case, but the relationship is valid). In a boost converter, the duty cycle is defined differently (1-D) and the input to output is reversed, but the zero ripple state (on the input) still occurs when the boost duty cycle is m/n, or 0 (the degenerate but valid case), 1/4, 1/2 or 3/4 (4/4 is not allowed, it is a short circuit on the input), yielding an output voltage, respectively, of Vi, 4/3 Vi, 2 Vi or 4 Vi.

What is claimed is:

1. An n-phase buck converter (where n is an integer greater than one) operating at a switching frequency f for converting power from a voltage source having a voltage output and a voltage return to an output load having a load input and a load return, the load return being connected to the voltage return of the voltage source, and having zero output ripple comprising a quantity n of buck converter sections, each of the n buck converter sections comprising an inductor having at least a first winding, the at least a first winding having a first terminal and a second terminal, an input switch connecting the voltage output of the voltage source to the first terminal of the at least a first winding of the inductor during the time that the input switch is closed, and a catch switch connecting the first terminal of the at least a first winding of the inductor to the voltage return of the voltage source during the time that the catch switch is closed, the input switch and the catch switch being constrained such that one and only one of the input switch and the catch switch is closed at any instant of time, and an output capacitor having a first terminal connected to all of the n second terminals of the at least a first windings of the n inductors and to the load input of the output load, and the output capacitor having a second terminal connected to the voltage return of the voltage source, wherein, at any instant of time during quiescent operation, a quantity m of the n input switches is closed (where m is an integer greater than one and less than n), wherein a switching period P is defined as the reciprocal of the switching frequency f, wherein each of the n input switches has the same duty cycle D where D is defined as the ratio of the time that the input switch is closed to the switching period P, and wherein D is equal to the ratio of m to n.

2. The n-phase buck converter of claim 1 wherein each of the n inductors has a second winding having a first terminal and a second terminal, wherein on each of the n inductors the first terminal of the at least a first winding has the same phase as the first terminal of the second winding, and wherein the second windings of the n inductors are connected in series such that the second terminal of each of the n inductors connects to the first terminal of the next of the n inductors in succession until all of the second windings of the n inductors are connected in a continuous series circuit.

3. The n-phase buck converter of claim 2 further comprising a control voltage injection means that is connected in series within the continuous series circuit of the n second windings of the n inductors for injecting one of a positive control voltage, zero control voltage and a negative control voltage.

4. The n-phase buck converter of claim 3 wherein the voltage injection means comprises a controlled voltage source.

5. The n-phase buck converter of claim 3 wherein the control voltage injection means comprises a control voltage source and a full bridge switching means having at least three switching connections such that for a first switching connection the control voltage source is connected into the continuous series circuit with a positive polarity, for a second switching connection the control voltage source is connected into the continuous series circuit with a negative polarity and for a third switching connection the continuous series circuit is connected through the full bridge switching means.

6. The n-phase buck converter of claim 3 wherein the control voltage injection means comprises a first resistor, a second resistor, the first resistor and the second resistor being in series and in series with the continuous series circuit, a control voltage source and a push pull switching means having at least three switching connections such that for a first switching connection the voltage control source is connected a cross the first resistor so as to inject a positive polarity voltage into the continuous series circuit, for a second switching connection the control voltage is connected across the second resistor so as to inject a negative polarity voltage into the continuous series circuit, and for a third switching connection the control voltage source is not connected across the first resistor and the second resistor.

7. A method of inducing very fast transitions of output current in a buck converter of the type comprising an n-phase buck converter (where n is an integer greater than one) operating at a switching frequency f for converting power from a voltage source having a voltage output and a voltage return to an output load having a load input and a load return, the load return being connected to the voltage return of the voltage source, and having zero output ripple comprising a quantity n of buck converter sections, each of the n buck converter sections comprising an inductor having a first winding a first terminal and a second terminal and a second winding having a first terminal and a second terminal, the first terminal of the at least a first winding having the same phase as the first terminal of the second winding an input switch connecting the voltage output of the voltage source to the first terminal of the at least a first winding of the inductor during the time that the input switch is closed, and a catch switch connecting the first terminal of the at least a first winding of the inductor to the voltage return of the voltage source during the time that the catch switch is closed, the input switch and the catch switch being constrained such that one and only one of the input switch and the catch switch is closed at any instant of time, and an output capacitor having a first terminal connected to all of the n second terminals of the at least a first windings of the n inductors and to the load input of the output load, and the output capacitor having a second terminal connected to the voltage return of the voltage source, wherein the second windings of the n inductors are connected in series such that the second terminal of each of the n inductors connects to the first terminal of the next of the n inductors in succession until all of the second windings of the n inductors are connected in a continuous series circuit, wherein, at any instant of time during quiescent operation, a quantity m of the n input switches is closed (where m is an integer greater than one and less than n), wherein a switching period P is defined as the reciprocal of the switching frequency f, wherein each of the n input switches has the same duty cycle D where D is defined as the ratio of the time that the input switch is closed to the switching period P, and wherein D is equal to the ratio of m to n, the method comprising suspending quiescent operation by inserting a period of time where at least m plus one of the n input switches is closed to increase rapidly the output current, and suspending quiescent operation by inserting a period of time where no more than m minus one of the n input switches is closed to decrease rapidly the output current.

8. A method of inducing very fast transitions of output current in a buck converter of the type comprising an n-phase buck converter (where n is an integer greater than one) operating at a switching frequency f for converting power from a voltage source having a voltage output and a voltage return to an output load having a load input and a load return, the load return being connected to the voltage return of the voltage source, and having zero output ripple comprising a quantity n of buck converter sections, each of the n buck converter sections comprising an inductor having a first winding a first terminal and a second terminal and a second winding having a first terminal and a second terminal, the first terminal of the at least a first winding having the same phase as the first terminal of the second winding an input switch connecting the voltage output of the voltage source to the first terminal of the at least a first winding of the inductor during the time that the input switch is closed, and a catch switch connecting the first terminal of the at least a first winding of the inductor to the voltage return of the voltage source during the time that the catch switch is closed, the input switch and the catch switch being constrained such that one and only one of the input switch and the catch switch is closed at any instant of time, and an output capacitor having a first terminal connected to all of the n second terminals of the at least a first windings of the n inductors and to the load input of the output load, and the output capacitor having a second terminal connected to the voltage return of the voltage source, wherein the second windings of the n inductors are connected in series such that the second terminal of each of the n inductors connects to the first terminal of the next of the n inductors in succession until all of the second windings of the n inductors are connected in a continuous series circuit, wherein, at any instant of time during quiescent operation, a quantity m of the n input switches is closed (where m is an integer greater than one and less than n), wherein a switching period P is defined as the reciprocal of the switching frequency f, wherein each of the n input switches has the same duty cycle D where D is defined as the ratio of the time that the input switch is closed to the switching period P, and wherein D is equal to the ratio of m to n, and further comprising a control voltage injection means that is connected in series within the continuous series circuit of the n second windings of the n inductors for injecting at least one of a positive control voltage, zero control voltage and a negative control voltage, the method comprising injecting a positive control voltage into the continuous series circuit to increase rapidly the output current, and and injecting a negative control voltage into the continuous series circuit to decrease rapidly the output current.

9. The n-phase buck converter of claim 2 wherein the voltage source is a controlled voltage source that is controlled to have a controlled voltage equal to Vi.

10. A method of inducing fast transitions of output current in a buck converter of the type comprising an n-phase buck converter (where n is an integer greater than one) operating at a switching frequency f for converting power from a voltage source having a voltage output and a voltage return to an output load having a load input and a load return, the load return being connected to the voltage return of the voltage source, and having zero output ripple comprising a quantity n of buck converter sections, each of the n buck converter sections comprising an inductor having a first winding a first terminal and a second terminal and a second winding having a first terminal and a second terminal, the first terminal of the at least a first winding having the same phase as the first terminal of the second winding an input switch connecting the voltage output of the voltage source to the first terminal of the at least a first winding of the inductor during the time that the input switch is closed, and a catch switch connecting the first terminal of the at least a first winding of the inductor to the voltage return of the voltage source during the time that the catch switch is closed, the input switch and the catch switch being constrained such that one and only one of the input switch and the catch switch is closed at any instant of time, and an output capacitor having a first terminal connected to all of the n second terminals of the at least a first windings of the n inductors and to the load input of the output load, and the output capacitor having a second terminal connected to the voltage return of the voltage source, wherein the second windings of the n inductors are connected in series such that the second terminal of each of the n inductors connects to the first terminal of the next of the n inductors in succession until all of the second windings of the n inductors are connected in a continuous series circuit, wherein the voltage source is a controlled voltage source that is controlled to have a controlled voltage equal to Vi, wherein the buck converter has an output voltage that is equal to Vo, wherein, at any instant of time during quiescent operation, a quantity m of the n input switches is closed (where m is an integer greater than one and less than n), wherein a switching period P is defined as the reciprocal of the switching frequency f, wherein each of the n input switches has the same duty cycle D where D is defined as the ratio of the time that the input switch is closed to the switching period P, wherein D is equal to the ratio of m to n, and wherein during quiescent operation the controlled input voltage Vi is equal to the output voltage Vo divided by the ratio of n to m, the method comprising controlling the controlled input voltage to be greater than the output voltage Vo divided by the ratio of n to m to induce a fast increasing transition of the output current, and controlling the controlled input voltage to be less than the output voltage Vo divided by the ratio of n to m to induce a fast decreasing transition of the output current.

* * * * *